(12) United States Patent
Fichter et al.

(10) Patent No.: US 6,424,913 B1
(45) Date of Patent: Jul. 23, 2002

(54) GPS NAVIGATIONAL SYSTEM AND ASSOCIATED PROCESS FOR SPACE APPLICATIONS

(75) Inventors: Walter Fichter, Munich; Eveline Gottzein, Hohenkirchen; Peter-Alexander Krauss, München; Michael Mittnacht, Hohenkirchen, all of (DE)

(73) Assignee: Astrium GmbH, Munich (DE)

( * ) Notice: Subject to any disclaimer, the term of this patent is extended or adjusted under 35 U.S.C. 154(b) by 0 days.

(21) Appl. No.: 09/510,917

(22) Filed: Feb. 22, 2000

(30) Foreign Application Priority Data

Feb. 19, 1999 (DE) .......................... 199 07 235

(51) Int. Cl.⁷ .......................... G05D 1/00; G01C 21/25
(52) U.S. Cl. .............................. 701/213; 701/3; 701/13; 701/226; 342/357.12; 342/352; 342/357.06; 455/12.1
(58) Field of Search .............................. 701/213, 3, 13, 701/214, 215, 226, 4; 342/357.12, 357.11, 357.05, 357.01, 357.06, 357.09, 357.1, 357.04, 352, 355, 359; 455/12.1, 456, 552, 553; 375/326, 343, 344

(56) References Cited

U.S. PATENT DOCUMENTS

| | | | | |
|---|---|---|---|---|
| 4,821,294 A | * | 4/1989 | Thomas, Jr. ................. 342/352 |
| 5,420,592 A | * | 5/1995 | Johnson .................. 342/357.12 |
| 5,528,502 A | | 6/1996 | Wertz .......................... 701/13 |
| 5,626,315 A | * | 5/1997 | Flament et al. ............. 244/168 |
| 5,677,928 A | * | 10/1997 | Rizzo et al. ................. 375/202 |
| 5,734,736 A | | 3/1998 | Palmer et al. .............. 382/103 |
| 5,798,732 A | * | 8/1998 | Eshenbach ............. 342/357.12 |
| 5,809,457 A | | 9/1998 | Yee et al. .................... 701/220 |
| 5,884,214 A | * | 3/1999 | Krasner ....................... 701/207 |
| 5,978,716 A | * | 11/1999 | Kamel et al. ................. 701/13 |
| 6,012,000 A | * | 1/2000 | Holmes et al. ................ 701/13 |
| 6,031,487 A | * | 2/2000 | Mickelson ............. 342/357.12 |
| 6,107,960 A | * | 8/2000 | Krasner ................. 342/357.09 |
| 6,111,540 A | * | 8/2000 | Krasner .................... 342/357.1 |
| 6,115,595 A | * | 9/2000 | Rodal et al. ........... 342/357.12 |
| 6,181,911 B1 | * | 1/2001 | Sih et al. ............... 342/357.12 |
| 6,191,731 B1 | * | 2/2001 | McBurney et al. .... 342/357.05 |
| 6,201,953 B1 | * | 3/2001 | Dwyer .................... 455/226.1 |

FOREIGN PATENT DOCUMENTS

| | | |
|---|---|---|
| EP | 0738947 | 10/1996 |
| JP | 8310500 | 11/1996 |
| WO | 9950618 | 10/1999 |

OTHER PUBLICATIONS

Averin, S. et al., "On Combined Application of GLONASS And GPS Systems in Conditions of Limited Observability of Navigation Satellites". ION GPS, (1996) pp. 287–295.

* cited by examiner

*Primary Examiner*—Jacques H. Louis-Jacques
(74) *Attorney, Agent, or Firm*—Ladas & Parry

(57) ABSTRACT

The invention provides GPS navigational system for a satellite in space which comprises a front end section having an input for receiving GPS signals from a plurality of satellites, a digital preprocessor connected to the front end section for digitally preprocessing the GPS signals received from the front end section, and a signal processor connected to the digital preprocessor for decoding the GPS signals to determine a position of the satellite. An on-board computer is provided and a first data bus line connects the data processor and the signal processor for bi-directional data exchange therebetween and a second data bus line connects the signal processor and the on-board computer for bi-directional data exchange therebetween.

16 Claims, 1 Drawing Sheet

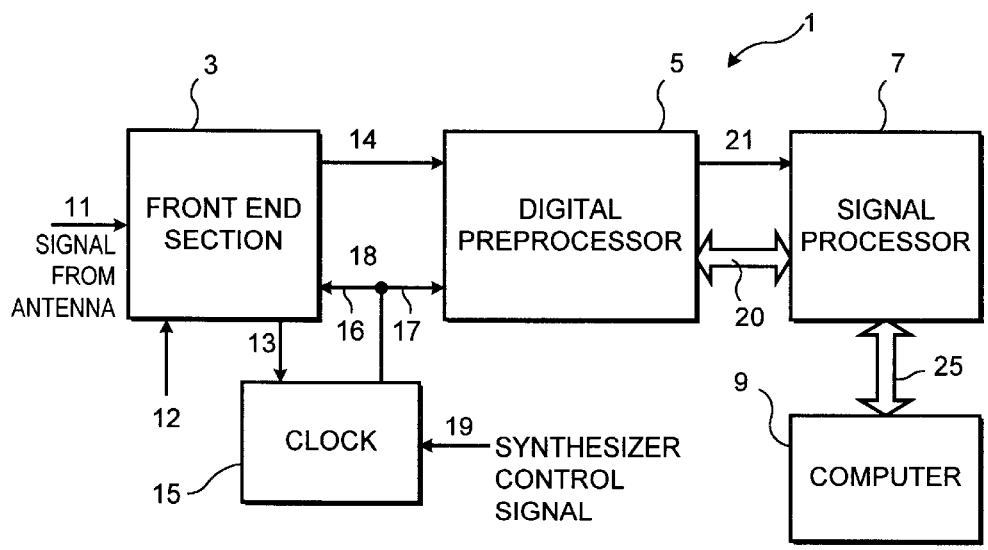
F I G. 1
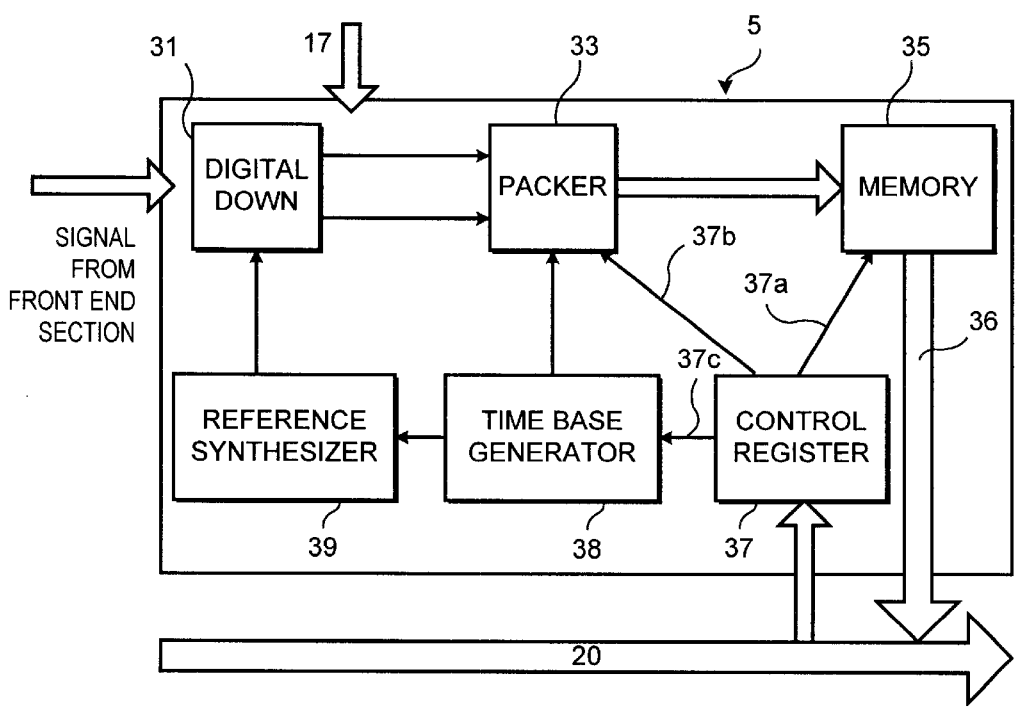
F I G. 2

GPS NAVIGATIONAL SYSTEM AND ASSOCIATED PROCESS FOR SPACE APPLICATIONS

FIELD OF THE INVENTION

The invention relates to an integrated GPS (Global Positioning System) navigational system for space applications and specifically for space vehicles and satellites. The invention also relates to associated navigational processes.

BACKGROUND

For on-board independent determination of navigation data of satellites, especially for determination of position, velocity and GPS time of the satellite, GPS navigation systems or GPS receivers are used. Depending on the position at which the satellite equipped with the GPS receivers is located relative to the GPS satellite constellation (orbiting altitude about 20,000 km), it is necessary to take into account whether the satellite orbit is below the GPS satellite constellation (low earth orbit, LEO), or whether the satellite orbit is above the GPS satellite constellation and normally in geostationary earth orbits (GEO, about 30,000 km).

In the case of LEO satellites, navigation is possible using the standard process for determination of position by GPS. For this purpose, at least four signals from four different GPS satellites to the GPS receiver are measured and processed in parallel channels and then the position (three unknowns) and the clock bias, i.e. the difference relative to a time reference value (one unknown) are calculated. Because of the geometric conditions at low orbits, four or more GPS satellites are normally always visible. The accuracy of determination of the position depends on the geometric distribution of the visible GPS satellites. A measure of this accuracy is a "dilution of precision" value (DOP), which is defined only for four or more satellites. This determination is usually also used for navigation planning, i.e. for defining the GPS satellites that will be used for determination of the satellite position, and the position error due to amplification of raw-data measurement errors.

Alternatively, sequential estimation methods (filter methods such as with Kalman filters) are also used with LEO-satellites for position determination. Thereby chronological measurements are combined with each other by means of dynamic models of the orbital movement and the on-board clock, so that, in the cases of LEO-satellites, these estimation methods lead to clearly improved estimates. For LEO-applications with sequential estimation methods, GPS-receivers are also usually used with four or more parallel channels, so that with this estimation method the DOP-measure can be used for also evaluating the navigational solutions, i.e. in particular for monitoring geometric independence of the measurement data.

The use of GPS in geostationary orbit with GEO-satellites has not heretofore been achieved. With GEO-satellites the use of sequential estimation methods is necessary, because in this case the GPS data cannot normally be received from four GPS-satellites simultaneously, and chronological measurements are necessary. Nevertheless, the poor geometric distribution of the GPS-satellites for the GEO-orbit, causes the estimates to greatly depend on the modeling uncertainty of the on-board clock. In the publication by S. Averin, V. Vinogradov, N. Ivanov, V. Salischev "On Combined Application of GLONASS and GPS Systems in Conditions of Limited" (in "Observability of Navigation Satellites", ION GPS 96, page 287 ff.) a possibility of how to avoid these difficulties is described. Therein, instead of using running time measurements, differences of running time measurements are used as a measured variable. Thereby the clock-bias, or, time-difference value of the on-board clock is limited and the dynamic model for the estimation filter now consists of only an orbit dynamics characteristic, with relatively high accuracy, and it no longer contains the relatively uncertain clock model.

The construction of a conventional GPS receiver usually comprises four components: an antenna, an HF (high frequency) front-end system (pre-amplifier, down converter, A/D converter), a digital signal processor, which, in particular, performs a correlation for determining carrier phases and code phases and comprises special digital electronic modules (ASICs), and a navigational processor (frequency lock means, phase lock means, delay means, means for decoding the navigational data, navigational planning means, and position determination means).

GPS navigational devices are currently available in the market. These devices have a disadvantage in space application in that they cannot be shared with other software programs of an on-board computer of the satellite. Consequently, LEO-satellites must be provided with an individual computer (CPU), a program and data memories, an on-board clock, a power supply as well as software modules, particularly for error monitoring and correction in addition to the other systems normally provided in LEO satellites. Consequently, the weight, performance, complexity and cost of the complete system are increased. Additionally, when estimating the satellite position by means of sequential data processing (filtering), there is limited or no access to information in the on-board computer of the satellite and which could be used to improve the estimated position. This information relates, for example, to accurate models of perturbing forces acting on the satellite, caused by thrust of the satellite drive means, or satellite-specific data corresponding to solar radiation pressure. The access to this data is particularly important if it is available during satellite operation, (for example, satellite mass).

A further disadvantage of the known devices is that a considerable part of the signal processing (correlation) of a GPS receiver is realized by means of electronic hardware. Radiation resistant electronic components, as used in space application, however, are very expensive and raise the cost of a GPS receiver, or are not even available or have to be specially produced.

SUMMARY OF THE INVENTION

An object of the invention is to provide a GPS navigational system on board a LEO or GEO satellite, which shares as many functions and resources with the devices already on board the satellite, and satisfies the usual requirements with respect to radiation resistance. The navigational system should also comprise means for determining the GPS system time.

An advantage provided by the invention is that a large part of the signal processing means, in particular the correlation of the GPS signal and the carrier signal, are realized by means of software. Consequently, the use of expensive, special radiation resistant electronic components (ASICs or Specific Integrated Circuits) is avoided.

In order to minimize computer requirements, according to the invention, the number of parallel processing channels is kept as small as possible, and less than four channels is preferable. This means, however, that a reduced number of GPS satellites need be visible, even for orbits below the altitude of the GPS orbit (approximately 20,000 km). Hence, measurement data from a restricted number of GPS satellites are used. Accordingly, position determination of the satellite is not directly possible but only by means of sequential estimation methods (filter process). However, this is not detrimental since the filter processes mainly rely on orbit models and disturbing forces, for example, thrust forces which are very well known and are mainly provided as software programs in the on-board computer of an orbit and attitude control system. Additionally, according to the invention, for measuring the transit time of a GPS (pseudorange) signal, it is regularly switched between all or most of the visible GPS satellites, so that geometric independent measurement data is obtained.

A further feature according to the invention, for improving the position estimates is that information updated in the on-board computer can be accessed, for example, external thrust forces generated by the satellite drive units. This possibility is provided, according to the invention, by the integration of the GPS receiver into the computer on-board the satellite. Accordingly, relevant information such as time of thrust activation, thrust direction and calibration parameters of the drive means normally supplied to the system are fed to the on-board computer.

For determining and monitoring the quality of the measurement geometry, i.e. the distribution of the GPS satellites, which are used for position determination, the conventional DOP-factor can no longer be used, since it is only defined for at least four GPS receivers which are simultaneously visible. However, according to the invention, the DOP-measurement can be replaced by a modified DOP-measurement, namely by taking into account not only the geometric distribution of the GPS satellites, but also their distribution in time and nominal movement of the receiver.

The invention provides a GPS navigational system for a satellite in space which comprises a front end section having an input for receiving GPS signals from a plurality of GPS satellites, a digital preprocessor device connected to the front end section for digitally reprocessing the GPS signals received from the front end section, and a signal processor connected to the digital preprocessor for decoding the GPS signals to determine the position of the satellite. An on-board computer is provided and a first data bus line connects the data preprocessor and the signal processor for bi-directional data exchange therebetween and a second data bus line connects the signal processor and the on-board computer for bi-directional data exchange therebetween.

BRIEF DESCRIPTION OF THE DRAWING

FIG. 1 is a diagrammatic illustration of the navigational system according to the invention.

FIG. 2 is a diagrammatic illustration in more detail of a portion of the navigational system according to FIG. 1.

DETAILED DESCRIPTION

FIG. 1 illustrates a GPS navigational system 1 comprising four components i.e. an antenna (not shown) for receiving GPS satellite signals, an HF (high frequency) front-end section 3 connected to the antenna and including a preamplifier, a mixer and an A/D converter, an FPGA (field programmable gage array) 5 for signal preprocessing, a signal processor 7 and an on-board computer 9, commonly provided on the satellite.

The antenna and the HF-front-end section 3 are conventional. The FPGA 5, the signal processor 7 and the on-board computer 9, differ from the prior art particularly regarding functional operation.

From the antenna the HF-front-end section 3 receives input signal 11 via an appropriate data line. Furthermore, for synchronization with the FPGA 5, the HF-front-end section 3 receives a reference signal 12, preferably 10 MHx. The HF-front-end section 3 produces a master signal 13 with a clock frequency of preferably 40 MHz, which is fed via an appropriate signal line to a clock 15. The clock 15 sends an appropriate scanning time signal via lines 16, 17 to the front-end section 3 and the FPGA 5. Additionally, the clock 15 receives a synthesizer control signal 19 from an input signal line. Because of this synthesizer control signal 19, the clock 15 sends, due to internal functions (not described), the scanning signal 18 at a frequency required by the HF-front-end section 3 and also by the FPGA 5, in particular at frequencies 5,71 MHz and 6,67 MHz respectively. The FPGA 5 is connected to the signal processor 7 by a data bus line 20, so that FPGA 5 and signal processor 7 can exchange data therebetween. Additionally, FPGA 5 is able to send interrupt signals by two appropriate lines 21 to the signal processor 7, in order to insure suitable data communication between FPGA 5 and signal processor 7. Additionally, the signal processor 7 and the on-board computer 9 can exchange data over a data bus line 25.

From the digital signal line 14, the FPGA 5 receives serial data which it sends to the front-end section 3. The signal processor 7 generates raw data of the measured values which are further processed by the on-board computer 9. The data generated by the signal processor 7 comprises propagation-time measured data, Doppler-frequency data or navigational data, such as ephemeris and almanac data. The on-board computer 9 comprises all functional and hardware modules of an orbit or attitude control system of a satellite. A reference signal 12 is sent via a data line, to the front-end section 3 by an oscillator provided in the on-board computer 9.

The FPGA 5, used for signal preprocessing, is schematically illustrated in FIG. 2. FPGA 5 comprises a digital down conversion unit 31 for converting the baseband (transformation of the input signal into a signal of lower frequency) with low-pass filtering and a comparator, which fixes the signal value (not explicitly shown in FIG. 2), a packer 33 for assembling bit-information into processor words and storing these words in a FIFO memory 35. The "output" of the FIFO 35 is a digital baseband signal 36, which is commonly represented by in-phase and quadrature components, whose frequency mainly represents the Doppler-frequency. The Pseudo-Random-Noise (PRN) Code and the navigational data (50 hz) are contained in the signal 36.

The FPGA 5 also comprises a control register 37, a time base generator 38 and a reference synthesizer 39. The control register 37 is coupled to the data bus 20 and is connected to the FIFO memory 35, the packer 33 and the time base generator 38 via signal or data lines 37a, 37b, 37c. By means of a line 41, the time base generator 38 is connected to the reference synthesizer 39 which is likewise connected to the down converter 31 by means of line 42.

Further processing of the signal 36 in the signal processor 7 mainly comprises correlation with the GPS code and with its carrier frequency, detection of the carrier phase error and/or the frequency error and the code-daily-error, filtering of the loops for frequency, phase and delay-lock, as well as a decoding of the navigational data. These functions are realized by means of software and are carried out by the signal processor 7. According to the invention, the signal processor 7 is simplified because the FPGA 5 carries out the functions of the down converter 31 and the packer 33, which have to be conducted at a very high frequency. The results of the signal processor 7 include the measured values, which are necessary for position solving.

The position solving is based on a sequential estimation method which is commonly performed by means of a Kalman-filter which is also used in the prior art for determining the navigational solution. The required dynamic model comprises the orbit dynamics as well as the clock dynamics in a 1-channel navigational system. In a 2-channel receiver, the clock-bias can be eliminated by the generation of so-called single-differences of the clock-bias. Thereby the modelling of the (uncertain) clock-bias can be avoided.

In a relatively precise modeling of the orbit dynamic characteristic of a satellite, navigation precision, comparable to or only slightly inferior to that obtained with a very large number of receiver channels, can be achieved despite a limited number of receiver channels (1). Precise modeling is possible because the navigation algorithm of signal processor 7 can exchange data directly with on-board computer 9 over data-bus line 25, and thus has access to all necessary (updated) data such as data specific to power values, for example, mounting directions of the thrusters, magnitude of thrust, on and off times of the thrusters, satellite mass and solar pressure. Therefore, the signal processor 7 is preferably mounted together with the on-board computer 9 in a rack.

Since for determining the position of the satellite, according to the invention, preferably less than four processing channels are used, i.e. less than four GPS satellite signals are received and processed in parallel the commonly used DOP-measure for accurate evaluation cannot be employed, because it is defined only for at least four parallel processing channels.

According to the invention less than four processing channels are processed sequentially in time for navigation by a sequential estimation method. According to this method, accuracy factor $\mu$ is defined, which takes into account the geometric and the time distribution of the measured values. The value of $\mu$ is given by the expression:

$$\mu = \sqrt{\text{trace}(M)}$$

wherein "trace", represents the sum of the diagonal elements of a matrix M, which is the co-variant matrix of the state error x at the time t=0 ($X_0$) and is determined in the navigational system by the following expression:

$$M = E\{\tilde{x}_o \tilde{x}_o^T\} = \underbrace{\left\{\sum_{i=1}^{n} \Phi(i,0)^T C(i)^T S^{-1} C(i) \Phi(i,0)\right\}^{-1}}_{=:M}$$

wherein $\Phi$ is the so-called transition matrix, which describes the dynamic characteristic of the orbit movement of the measuring satellite and the dynamic characteristic of the clock of the navigational system, and is determined in the navigation system by means of model assumptions. For the meaning of C and V, the condition x(k) at the time t=k is generally mathematically defined by the following expression:

$$x(K) = \Phi(k,O)x(O)$$

wherein x(O) describes the condition of a satellite at an initial point of time. For determining M, C is the measuring matrix and describes the correlation between motion state x(k) and measured variable y(k), and S is the co-variant matrix of the measuring noise v. The significance of C and v of the measured value y measured by the navigational system can be generally described by the equation:

$$y(k) = C(k) \times (k) + v(k)$$

wherein C mainly depends on the line of sight (direction vector) from the navigational system to the respective GPS satellite. S is fixed and is based on model assumptions and defines the quality (inaccuracy) of the measured values y(k).

With a one-channel navigational system which provides measured values of the signal running time and also the Doppler-frequency, vector Y has the dimension 2×1 and the measuring matrix C has the dimension 2×8. If there are several channels and/or no Doppler information, the dimension changes accordingly. With three channels without Doppler-information, the vector Y has the dimension 3×1 and the measuring matrix the dimension 3×8, whereas the dimensions of Y and C with three channels with Doppler-information are 6×1 and 6×8 respectively.

The number n of measurements in time from the present into the past should not be too large in order to be able to clearly recognize an unfavorable situation with regard to independent measurements (geometric time related).

Depending on the application, the parameter $\mu$ can also be calculated by selected diagonal elements of M. For example, if only position measurements are relevant, the following equation is applicable which corresponds to the classic PDOP for time-related determination of point position:

$$\mu_p = \sqrt{M_{11} + M_{22} + M_{33}}$$

In order to evaluate the instantaneous navigational accuracy, the parameter $\mu$ is calculated from the actually acquired GPS satellites for a preset period of time by means of the last n-data points. Thereby it is easy to monitor whether the measured data provide a well conditioned position estimate. If there is no monitoring available, an appropriate analysis would have to be done by means of raw data transmitted to the ground station, which is time consuming and laborious.

According to the invention, instead of the sequential estimate method of the prior art to determine position data, velocity data and/or GPS system time, by DOP parameters, the parameter $\mu$ is used. The aforesaid sequential estimate method is described for example in the publication of: bradford W. Parkinson, James J. Spilker, Penina Axelrad, Per Enge, "Global Positioning System: Theory and Applications, Volume 1" ("Progress in Astronautics and Aeronautics, Volume 163, American Institute of Aeronautics and Astronautics").

The sequential estimate method can be implemented in the on-board computer 9 or in the signal processor 7. Essential is that the sequential estimate method in the on-board computer 9 processes given and updated system data, such as power unit data, in conventional fashion. System data, according to the invention, describe the dynamic model of the satellite motion and the time-related change of the clock and have an influence on the navigational algorithms.

The generation of the raw data measured values in the signal processor 7 is carried out in an appropriate number of parallel channels, preferably less than four, in order to minimize the demands on the signal processor 7. Thereby, providing parallel channels does not mean that a multiplicity of signal processors 7 are used for simultaneous signal processing in time. In contrast, real-time digital processing using software in conventional manner is carried out in single signal processor 7.

Although the invention is disclosed with reference to particular embodiments thereof, it will become apparent to those skilled in the art that numerous modifications and variations can be made which will fall within the scope and spirit of the invention as defined by the attached claims.

What is claimed is:

1. A GPS navigational system for a satellite having an on-board computer for controlling operation of the satellite, the system comprising a front end section having an input for receiving GPS signals from a plurality of GPS satellites, a digital preprocessor device connected to said front end section for digital reprocessing of the GPS signals received from the front end section, a signal processor connected to said digital preprocessor device for decoding the GPS signals to determine a position of the satellite, a first data bus line connecting said digital preprocessing device and said signal processor for bi-directional data exchange therebetween, and a second data bus line connecting said signal processor and said on-board computer for bi-directional data exchange therebetween such that at least a portion of the operation of determining the position of the satellite by the GPS navigational system is carried out by the on-board computer and data in a data bank in said on-board computer related to satellite propulsion is directed from the on-board computer to said signal processor.

2. The system as claimed in claim 1, wherein said data bank contains specific data related to satellite propulsion, said signal processor being connected to said on-board computer by said second data bus line to communicate with said data bank to receive the data related to the propulsion of the satellite.

3. The system as claimed in claim 1, comprising a clock having an input connected to said front end section and an output connected to said front end section and said digital preprocessor.

4. The system as claimed in claim 1, wherein said on-board computer includes an oscillator for producing a reference oscillator signal which is fed to said front end section.

5. The system as claimed in claim 1, wherein said on-board computer comprises means for determining a navigational position of the satellite by a sequential estimation method.

6. The system as claimed in claim 1, wherein said signal processor comprises means for determining a navigational position of the satellite by a sequential estimation method.

7. The system as claimed in claim 1, wherein the input of the front end section has a plurality of processing channels related to respective GPS satellites, the processing channels being less than four in number.

8. A process for operating a navigational system of a satellite in space based on signals from satellites of a GPS system, said process comprising:
receiving data signals from satellites of a GPS system and transmitting the signals to a front end section of a navigational system on a satellite in space,
digitally preprocessing the signals received by the front end section in a digital preprocessor,
decoding in a signal processor the signals which have been preprocessed in the digital preprocessor,
connecting the digital preprocessor and the signal processor for bi-directional data exchange therebetween,
connecting the signal processor and an on-board computer on the satellite, which controls operation thereof, for bi-directional data exchange therebetween,
transmitting specific data related to propulsion means for driving the satellite from a data bank in said on-board computer to said signal processor, and
determining a position of the satellite in space by said navigation system in combination with said on-board computer and based on data exchange therebetween.

9. A process as claimed in claim 8, wherein said propulsion means comprises jet thrusters, said process further comprising incorporating in said data bank, data relating to thrust direction of the jet thrusters, magnitude of thrust and intervals of operation and shutdown of said jet thrusters.

10. A process as claimed in claim 8, further comprising transmitting data from the on-board computer to the signal processor, related to mass of the satellite.

11. A process as claimed in claim 8, further comprising transmitting data from the on-board computer to the signal processor, related to solar pressure.

12. A process as claimed in claim 8, further comprising producing a reference oscillator signal by the on-board computer and supplying said reference signal to said front end section.

13. A process as claimed in claim 8, further comprising determining navigation position, velocity and GPS time of the space vehicle by a sequential estimation method based on data in the on board computer.

14. A process as claimed in claim 13, wherein the sequential estimation method is expressed by the relation $\mu = \sqrt{M_{11} + M_{22} \cdot M_{33}}$ where M is the co. variant matrix of estimation error of parameters of the space object.

15. A process as claimed in claim 13, further comprising carrying out the sequential estimation method in the signal processor.

16. A processor as claimed in claim 13, further comprising carrying out the sequential estimation method in the on-board computer.

* * * * *